UNITED STATES PATENT OFFICE.

T. STOREY, OF LANCASTER, COUNTY OF LANCASTER, AND W. V. WILSON, OF EAST LONDON, COUNTY OF MIDDLESEX, ENGLAND.

IMPROVEMENT IN THE MANUFACTURE OF LEATHER-CLOTH.

Specification forming part of Letters Patent No. 59,530, dated November 6, 1866.

*To all whom it may concern:*

Be it known that we, T. STOREY, of Lancaster, county of Lancaster, and W. V. WILSON, of East London, county of Middlesex, England, have invented an Improvement in the Manufacture of Leather-Cloth, of which the following is a specification.

This invention relates to a peculiar mode of coloring and bronzing leather-cloths, whereby a superior effect is obtained to that which can be obtained by the ordinary or existing mode of manufacture.

In manufacturing colored and bronzed leather-cloths according to this invention, it is proposed to apply to the surface of such cloths, after they have been prepared or coated in the ordinary manner, certain well-known coloring-matters, consisting of solutions of roseine or magenta, or of aniline or pheugle, blues and violets of all shades, and also of aniline greens, also of the violets obtained by the action on roseine of the iodides of the well-known alcohol radicals, and also the violets obtained by the action on roseine of the iodides of the Beta alcohol radicals, such as iodide of Beta hexyl in alcohol or in other volatile solvent of the above-named coloring-matters, in combination or otherwise with gum solutions.

These coloring-matters are applied to the coated surface of the leather-cloth by hand or by means of rollers or other suitable mechanical contrivances.

In order to produce bronzed leather-cloth goods it is simply necessary to apply the plain solution of any of the coloring-matters hereinbefore described with or without admixture with any soluble gum solution, and when dry to burnish the surface by burnishers or other well-known means. If, however, the goods are not required to present a bronzed appearance, then the color may be mixed with or without the gum solution, or the surface may be varnished after the color has been applied.

We claim—

The application and use to and in the manufacture of what are known as "American leather-cloth goods" of coloring-matters of the nature hereinbefore described.

In testimony whereof we have signed our names to this specification in the presence of two subscribing witnesses.

THOMAS STOREY.
WILLIAM VIRGO WILSON.

Witnesses to the signature of the said Thomas Storey:
H. WIRT FOSBROOKE,
H. W. LORD.

Witnesses to the signature of the said William Virgo Wilson:
J. HENRY JAMISON,
J. J. REIDLER.